Nov. 27, 1962  F. E. SCHULTZ  3,065,596
REIGNITABLE SOLID ROCKET MOTOR
Filed Sept. 28, 1959
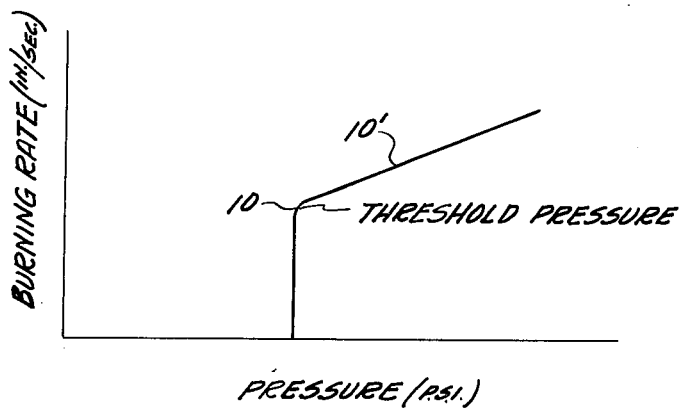
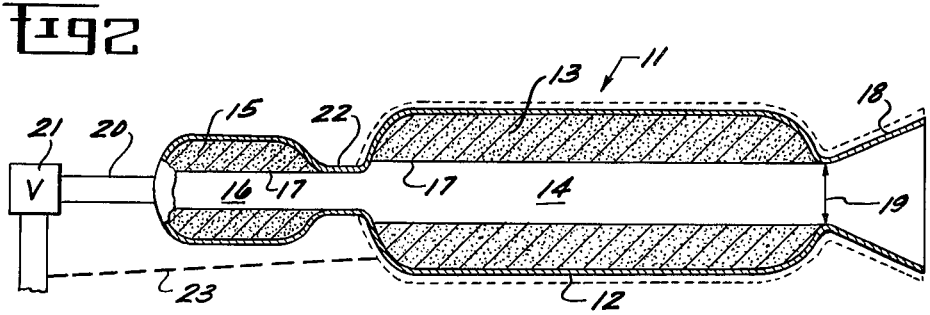
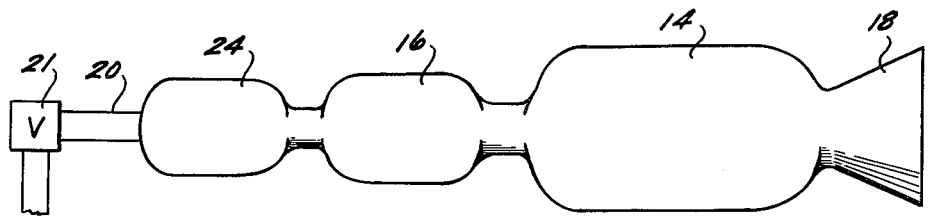
INVENTOR.
FREDERICK E. SCHULTZ
BY John F. Cullen
ATTORNEY

United States Patent Office

3,065,596
Patented Nov. 27, 1962

3,065,596
REIGNITABLE SOLID ROCKET MOTOR
Frederick Edwin Schultz, Ballston Lake, N.Y., assignor to General Electric Company, a corporation of New York
Filed Sept. 28, 1959, Ser. No. 842,734
6 Claims. (Cl. 60—35.3)

The present invention relates to a reignitable solid rocket motor and, more particularly, to a controllable solid propellant rocket motor and method of operation thereof which permits it to be turned on and off at will during operation.

There are basically two types of rocket motors in existence today, the liquid propellant type and the solid propellant type. Both types have their advantages and disadvantages. One of the advantages of liquid propellant motors is that the liquid may be easily controlled and turned off to shut the motor down and the motor may be restarted by turning the liquid on again. The disadvantage of the liquid propellant type motor is the difficulty of liquid storage and the complexity and profusion of parts involved in the control mechanism. On the other hand, solid propellants are useful because of their ease of storage in which the propellants can be cast in a block form, mounted in the rocket engine, and set aside until time for use. The disadvantage is that, once ignited, the propellant burns until exhausted since there is no reliable means to extinguish the rocket and then reignite it.

It is felt that a solid propellant rocket propulsion system could become a considerably more practical and versatile means of propulsion if it were provided with a means of accurate, repeatable and reliable thrust termination and restarting means. In the advent of space flight, whether liquid or solid propellants are used, accuracy requires reignitable engines to permit entering an orbit which may not be quite correct, and then making adjustments by firing the engine in short bursts. Additionally, in any system in which it is necessary to fly at a fairly constant velocity, it is possible to remain at the fairly constant velocity by turning the motor on for a few seconds, turning it off and letting the vehicle coast down and then reigniting to accelerate, etc. It is thus possible to keep the velocity within a desired band. The ability to control the firing and to reignite the solid propellant motor would permit uses not heretofore practical. Normally, the solid propellant continuously burns and the vehicle constantly accelerates until it exhausts the fuel or eventually destroys itself.

A known means of controlling rocket solid propellants has been to provide the combustion chamber with blow-out plugs to reduce the pressure below that at which combustion may be maintained and to time the blow-out to occur at the desired instant. A recent development directs the gases so discharged to produce a negative thrust to effect clean separation in multiple stage rockets. However, this has the disadvantage in that very little control is possible since the plugs cannot be easily reinserted and the propellant reignited. Also, the fuel remaining after extinguishment is wasted. An additional means has been to provide many separate solid propellant charges and fire them in series in a timed interval. However, such a system lacks the flexibility of the system of the present invention.

The main object of the present invention is to provide a solid propellant rocket motor which may be extinguished and reignited at will during operation.

A further object is to provide such a motor which is inherently inoperable without the addition of an external fluid mass.

A still further object is to provide such a motor and a method of operating it which requires the operation of a simple valving mechanism to start and stop the solid propellant's combustion at will and provide accurate control of thrust generation.

Another object is to provide such a motor and a method of operating it which requires a simple valving mechanism to start and stop the propellant combustion at will and a small amount of control fluid to accurately control a large amount of combustion.

Briefly stated, the invention discloses a solid propellant motor which is designed to produce combustion products in a series of combustion chambers and in which the downstream chamber is a thrust chamber with a nozzle. The thrust chamber has a main propellant charge therein which is designed to produce combustion products at a pressure below a threshold pressure so that combustion is not normally possible. In order to bring the pressure up to the required level to support combustion, an upstream booster mechanism is employed, which generates a fluid which is discharged into the thrust chamber to increase the pressure therein above threshold pressure either by itself or in conjunction with gas generated by the main charge to attain combustion at the design rate. The booster charge may be accurately controlled by the introduction of an additional fluid mass to sustain combustion in the booster charge by increasing its pressure also above its own threshold pressure. By maintaining a constant nozzle exit area, combustion is possible during the introduction of the additional mass and the additional mass and products of combustion of the booster chamber are directed to the thrust chamber to cause and/or sustain combustion therein. The series of chamber arrangements permits a cumulative effect and accurate control by the use of the additional control fluid mass and the system may be so designed that a very low flow rate can accurately control a very large solid propellant rocket and can start and stop the solid propellant at will.

While the specification concludes with claims particularly pointing out and distinctly claiming the subject matter which I regard as my invention, it is believed the invention will be better understood from the following description taken in connection with the accompanying drawing in which:

FIGURE 1 is a graph illustrating a propellant burning characteristic and showing the threshold pressure discussed in connection with the invention;

FIGURE 2 is a diagrammatic cross-sectional view of a solid propellant rocket motor having a booster charge separate from the main casing; and, FIGURE 3 is a diagrammatic showing similar to FIGURE 2 showing a plurality of combustion chamber arrangements.

In the course of solid propellant formulation work, it has been found that certain grains in the solid propellant casting stop burning as the pressure drops below a certain minimum value which is called the "threshold pressure." Most burning processes proceed faster at higher pressure and the burning occurring in the solid propellant rocket is no exception. Thus, a pressure below the threshold pressure is too low to maintain combustion at a rate sufficient to sustain this threshold pressure. The curve illustrating this phenomenon is shown in FIGURE 1 wherein the burning rate in inches per second is plotted against the chamber pressure in pounds per square inch for a class of propellants. As can be seen by referring to FIGURE 1, this propellant will be extinguished when the threshold pressure 10 is reached. This pressure will depend on the material propellant used. It is well-known that most rocket propellants of the ordinary variety will not burn at low pressure and have to have rather high pressure so that they can burn. This means that if a solid rocket is provided with a certain size throat in the nozzle, it will burn and operate properly at some point 10' on the curve known as the design pressure. However, if a larger throat is then provided, the pressure drops since fluid discharge is greater than fluid generation and the burning is extinguished. Thus, it is possible by dropping the pressure by either blow-out plugs or varying the nozzle, to extinguish this combustion in the combustion chamber. However, most rocket engines have a fixed area nozzle which is much simpler and avoids the complexity of the variable area type. Such a nozzle, of course, does not permit the use of the nozzle as a pressure varying means.

As previously stated, when the pressure is dropped below the value called the threshold pressure, burning stops. Usually this characteristic has been considered undesirable in solid propellants and little effort has been made to develop even an empirical understanding of the various facors which affect the threshold pressure. Neither has any extensive study been made of the characteristics of the threshold pressure, with the idea of making use of these characteristics to construct a controllable solid propellant rocket motor.

In designing a solid propellant motor, the burning surface and exhaust area are so designed by known methods that the motor inherently develops more than the threshold pressure during combustion. This means that if the pressure in the combustion chamber is below the threshold pressure, the rate of gas generation is insufficient to maintain the chamber at that pressure without control fluid and the chamber pressure will rapidly decrease to ambient pressure at which point no burning takes place. If the chamber pressure is above the threshold pressure, sufficient gas is generated in conjunction with the control fluid, such that an equilibrium condition, such as 10' is reached. For convenience, these two conditions are referred to herein as no combustion below threshold pressure and combustion above threshold pressure. By deliberately designing the solid propellant charge to have, by itself, an insufficient gas generation rate to maintain the threshold pressure, it is possible to introduce additional mass flow from external sources to increase the internal pressure and raise it about the threshold pressure to sustain burning. With a fixed nozzle, it is possible then to provide controlled shutdown and reignition in solid propellant motors.

In the discussion of the invention, it will be assumed that the usual ignition source is provided where required although not specifically shown and the invention directs itself to the means by which control is maintained.

The present invention is an improvement on co-pending application Serial Number 843,021, filed September 28, 1959 and a different modification or concept of the invention in co-pending application Serial Number 844,313, filed October 5, 1959, both of which are assigned to the assignee of the instant invention. In the first or basic application, there is disclosed and claimed the basic concept above described. The present invention is directed to an improvement thereto in which the external introduced fluid mass can be considerably smaller requiring smaller and lighter hardware and further simplification of the basic invention of the above application.

In FIGURE 2, there is illustrated a typical diagrammatic showing of a solid propellant rocket motor of the instant invention, indicated at 11. This motor may consist of a casing 12, housing a main solid propellant charge 13 designed to burn in main combustion chamber 14 and a booster charge 15 designed to burn in the booster combustion chamber 16. It will be appreciated that this showing is merely diagrammatic and separation is obtained between the main and booster charges and combustion chambers by neck 22 as shown. Combustion takes place in the usual manner along burning surface 17 of both charges. To provide for simplicity, a nozzle 18 with a fixed throat area 19 is connected to the downstream chamber 14 to form a thrust chamber therewith. It can be seen that the chambers are connected in series so that combustion products generated in booster chamber section 16 flow into main chamber section 14 and thence out through nozzle 18 to provide propulsion. As previously stated, by designing the solid propellant main charge 13 with its burning surface 17 in such manner, that its combustion products are at a pressure below threshold, then the internal pressure in chamber 14 is insufficient to support combustion, and it can be seen that no combustion will take place in motor 11 under normal circumstances, which is, without the addition of the control fluid as will be explained hereinafter.

In order to sustain combustion, it is necessary to increase the mass flow of fluid in chamber section 14 to increase the pressure above threshold pressure. This may be done by introducing a fluid mass from an external source as completely described and claimed in the aforementioned basic co-pending application. However, by a direct introduction of external fluid mass as shown in the basic co-pending application, the flow rate, i.e., the external flow required, may be quite high and in the order of approximately ten percent of the main discharge rate from motor 11. Such a large control flow rate requires larger than desired pumps, pipes, valves, etc., and it is desired herein to reduce the control flow required and achieve the same results. This is accomplished in the instant invention by providing the additional booster charge 15 in which, as seen by FIGURE 2, ignition is initiated and/or sustained by the pressure due to the introduction of an external fluid mass through pipe 20 under the control of valve 21. As shown, booster charge 15 is designed and made up as a suitable solid propellant with its burning surface 17 in such manner, that its combustion products are at a pressure below its threshold pressure so that it cannot normally support combustion. Ignition may be obtained by any suitable means such as by the introduction of any liquid mono-propellant such as hydrogen peroxide or reactive fluid such as fluorine which can also be used to increase the pressure above threshold and thereby support combustion. In the event that a mono-propellant is used, a suitable catalyst such as the screen shown in the co-pending application would be used to decompose the mono-propellant. It will be apparent, that charge 15 will not burn in the absence of the external fluid mass introduced through pipe 20.

Thus, by the introduction of the external fluid mass through pipe 20 to initiate and/or sustain combustion of charge 15 by increasing the threshold pressure to the required value, it can be seen that the products of combustion in chamber 16 and the fluid mass introduced from pipe 20, both flow in the downstream direction into chamber 14. By proper design, this additional pressure in chamber 14 is sufficient to increase the main chamber pressure above the threshold pressure of the main propellant charge and permit combustion in chamber 14. Also, selective control or regulation may be obtained by suitable means such as valve 21 to regulate the admission of fluid. It will be apparent therefore that a small amount of control fluid or external mass introduced through pipe 20 may thereby control ignition and combustion in chamber 16 and the products of both, in turn, control combustion in chamber 14. By this sequential or series arrangement, where cumulative effects are used, it is possible to use a small amount of control fluid and smaller hardware to achieve the desired results. If desired, regenerative cooling by the control fluid may be obtained by directing it first to the casing as shown very diagrammatically at 23.

The modification in FIGURE 3 is an additional series arrangement of the type shown in FIGURE 2. In this illustration, three chambers 24, 16 and 14 are shown interconnected in the manner described in FIGURE 2.

Each chamber is designed with its threshold pressure higher than the adjacent downstream chamber so that the cumulative effect is sequential combustion; i.e., there is initiation of combustion in chamber 24 by the control fluid in pipe 20 which, in turn, initiates combustion in chamber 16 which, in turn, initiates the combustion in chamber 14. By the addition of further series chambers, it can be seen that the control fluid and hardware required can become very small for high accuracy. For example, if the control flow required in the above identified basic co-pending application is ten percent of the main discharge rate, it is possible, by suitable design, to reduce this to a figure in the order of one percent by the cumulative effect shown in the modification of FIGURE 2 and to further reduce the fluid control flow required to one tenth of one percent in the modification shown in FIGURE 3.

As previously stated, the control fluid may be a suitable liquid mono-propellant such as liquid hydrogen peroxide in which case the liquid or the products of decomposition may be introduced and directed into the combustion chambers in the manner described. It can be seen that the instant invention is an improvement on the basic co-pending application to permit accurate control of solid propellant motors with a smaller amount of control fluid thereby requiring lighter and smaller hardware.

While there has been hereinbefore described the preferred form of my invention, obviously many modifications and variations of the present invention are possible in the light of the above teachings. It is therefore to be understood that within the scope of the appended claims, the invention may be practiced otherwise than as specifically described.

I claim:

1. A controllable solid propellant rocket motor comprising, at least two combustion chambers connected in series, a propulsion nozzle connected to the last chamber in said series to form a thrust chamber at the downstream end of said series, each combustion chamber having a solid propellant therein designed to produce combustion products at a pressure below threshold pressure, the threshold pressure of each chamber being below that of the adjacent connected upstream chamber, and means connected to the first upstream chamber to direct additional fluid mass into said chamber to increase the pressure therein above the threshold pressure to support combustion therein whereby the combustion products and fluid mass pass downstream to successively increase the pressure in each chamber above the threshold pressure to support combustion in said chambers.

2. Apparatus as described in claim 1 wherein valve means is provided in the fluid directing means to regulate the admission of the additional fluid mass.

3. Apparatus as described in claim 1 wherein said additional fluid is a liquid mono-propellant.

4. A controllable solid propellant rocket motor comprising, a main combustion chamber having a solid propellant therein designed to produce combustion products at a pressure below threshold pressure, a propulsion nozzle connected to said main chamber to form a thrust chamber therewith, a booster combustion chamber upstream of said main chamber and connected to discharge into said main chamber, said booster chamber having a solid propellant therein designed to produce combustion products at a pressure below threshold pressure, the threshold pressure of said booster propellant being higher than said main propellant, and means connected to said booster chamber to direct additional fluid mass into said booster chamber to increase the pressure therein above the threshold pressure to support combustion in the booster chamber, whereby the combustion products and fluid mass pass downstream to increase the pressure in said main chamber above threshold pressure to support combustion therein.

5. Apparatus as described in claim 4 wherein valve means is provided in the fluid directing means to regulate the admission of the additional fluid mass.

6. The method of operating a solid propellant rocket motor consisting of designing the solid charge in a combustion chamber to have a burning surface to produce products of combustion at a pressure less than the threshold pressure, providing a connected series of such charges each having a threshold pressure higher than the adjacent downstream charge, increasing the pressure in the first charge above threshold pressure by introducing an external fluid mass to permit combustion and permitting the fluid mass and combustion products to cumulatively pass downstream increasing the pressure in each subsequent chamber above threshold pressure to permit combustion, and controlling the combustion by controlling the admission of the external mass at will.

References Cited in the file of this patent

UNITED STATES PATENTS

| 2,555,333 | Grand et al. | June 5, 1951 |
| 2,791,883 | Moore et al. | May 14, 1957 |
| 2,906,094 | Damon et al. | Sept. 29, 1959 |